(12) United States Patent
Kotani et al.

(10) Patent No.: US 6,795,578 B1
(45) Date of Patent: Sep. 21, 2004

(54) IMAGE PROCESSING APPARATUS AND METHOD, AND STORAGE MEDIUM

(75) Inventors: Takuya Kotani, Yokohama (JP); Osamu Itokawa, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 09/669,679

(22) Filed: Sep. 26, 2000

(30) Foreign Application Priority Data

Sep. 29, 1999 (JP) .......................................... 11-276547
Nov. 30, 1999 (JP) .......................................... 11-339071
Nov. 30, 1999 (JP) .......................................... 11-339072

(51) Int. Cl.[7] .............................................. G06K 9/34
(52) U.S. Cl. .................. 382/180; 382/243; 375/240.16; 375/240.24
(58) Field of Search .............................. 382/232–253, 382/173–180; 375/240–242

(56) References Cited

U.S. PATENT DOCUMENTS 5,455,874 A * 10/1995 Ornsby et al. ............... 382/251
5,774,581 A * 6/1998 Fassnacht et al. ........... 382/171
5,809,176 A * 9/1998 Yajima ....................... 382/233
6,157,745 A * 12/2000 Salembier ................... 382/236
6,192,078 B1 * 2/2001 Komiya et al. ......... 375/240.16
6,516,090 B1 * 2/2003 Lennon et al. .............. 382/173

OTHER PUBLICATIONS

Won, "A block–based MAP segmentation for image compression" IEEE trans. on Circuits and Systems for Video Technology, col. 8, issue 5, pp. 592–601, Sep. 1998.*

Zhang et al. "The application of mean field theory to image motion estimation" IEEE trans. on Image Processing, vol. 4, No. 1, pp. 19–33, Jan. 1995.*

* cited by examiner

Primary Examiner—Jingge Wu
(74) Attorney, Agent, or Firm—Fitzpatrick, Cella, Harper & Scinto

(57) ABSTRACT

This invention provides an image processing apparatus/method characterized by inputting successive image data, dividing the image data into blocks each formed from a plurality of pixels, detecting the motion vector of each block, calculating a probability at which the block has a predetermined area label, in accordance with the motion vector and the area label of a neighboring block, determining the area label of each block in accordance with the calculation result, and dividing the image data into areas of respective objects in accordance with the determined area label.

29 Claims, 9 Drawing Sheets

IMAGE PROCESSING APPARATUS AND METHOD, AND STORAGE MEDIUM

BACKGROUND OF THE INVENTION

1. Field of the Invention

The present invention relates to an image processing method and apparatus, and a storage medium and, more particularly, to an image processing method and apparatus for extracting an object in a moving picture, and a storage medium which stores program software for executing the method.

2. Related Background Art

In recent years, a great deal of attention is paid to processing of separating and synthesizing image information in units of objects. In particular, an MPEG-4 encoding scheme as an international standard receives a great deal of attention as a moving picture compression/encoding scheme. The MPEG-4 scheme can separate a plurality of objects in image data of one frame forming moving picture data, and encode/decode each object. This can facilitate an increase in encoding efficiency, data distribution in accordance with a transmission path, and re-processing of images. Various applications, which are difficult to realize by a conventional scheme, are expected.

An object can take any arbitrary shape, and is made up of a combination of data called a "shape" representing shape information, and data called a texture representing the contents of an image.

The conventional object generation method includes a chromakey separation method using a studio set and the like, a generation method using computer graphics (CG), and an extraction method using a natural image.

One of methods of separating a background and object from a natural image is an area division method.

Area division methods for a still image can be roughly classified into two. One gives attention to the discontinuity of areas, and the other gives attention to the continuity of areas. As an example of the former method, an edge detection method is known. The edge detection method is disadvantageous in that a detected edge does not always form a closed area. As an example of the latter method, a region growing method is known. The region growing method sets a region serving as a seed in a still image, and uses pixels having features closer to the seed area among pixels adjacent to the seed, thereby forming the region.

Area division is influenced by noise on data. For example, in the edge detection method, an edge cannot be normally detected owing to noise. In the region growing method, a region which should grow is trapped to an extreme under the influence of noise.

To reduce the influence of noise, MRF (Markov Random Field) resistant to noise is often used for area division processing.

As a region division method using MRF, a heat bath method is known.

Region division by the heat bath method can be realized by, e.g., the following processing. The processing unit of area division is called a cell. A cell has the number of a cluster to which the cell belongs, as the area label (state value) of the cell.

In the first step, the initial value of the area label of each cell is determined using a random number. The parameter of a cluster is set in accordance with cells which are classified based on their initial values and belong to each cluster. For example, the parameter of the cluster is the average color of cells belonging to the cluster.

In the second step, the probability at which a cell belongs to each cluster is calculated for all the cells by an MRF probability function. The area label of the cell is determined in accordance with the calculated probability.

Assume that the number of a cluster exhibiting the highest probability is set as the area label of the cell. This area label determination method for cells is called ICM (Iterated Conditional Modes).

In the third step, the parameter of the cluster is set again in accordance with the area labels of cells determined in the second step.

In the fourth step, cells whose area labels have changed in the second step are checked. Processing from the second step is repeated until the ratio of cells whose area labels have changed decreases to a predetermined ratio to all the cells. This repetitive processing decreases a frequency of the change of the area label, and when the change ratio reaches the predetermined ratio, the area labels of cells are determined as final area labels.

This processing determines the area label of each cell, and cells can be classified based on their area labels.

The calculation amount of the heat bath method is determined by the number of cells, the number of clusters, and the repeat frequency of the second to fourth steps.

In area division of a moving picture, motion information is often added as a feature amount. The motion information is made from a two-dimensional motion amount (motion vector) obtained by finding out, e.g., the correspondence point of a pixel between frames.

Calculation of the motion vector generally adopts a method using block matching. A matching evaluation function is defined, and a vector value at which an evaluated value minimizes within a search range is selected.

As described above, the motion vector is an important parameter in extracting an object from a moving picture. However, a motion vector calculated by a conventional method does not always accurately reflect the motion of an actual block.

For example, when an image within a block is flat, a portion where matching is established cannot be determined, and a vector at which the evaluation function minimizes changes due to slight noise or changes in luminance. If an image does not contain any edge in both the horizontal and vertical search directions, an accurate motion vector is difficult to be detected. When a repetitive pattern similar to a block exists in the search range, an accurate motion vector is difficult to detect.

If an object is determined using as a determination criterion a motion vector which is not necessarily accurate, an erroneous extraction result (area division) is generated.

SUMMARY OF THE INVENTION

The present invention has been made in consideration of the above situation, and has as its object to provide an image processing apparatus and method capable of accurately extracting an object from the frame of moving picture data, and a storage medium which stores the image processing program.

To achieve the object, according to one aspect of the present invention, there is provided an image processing apparatus/method characterized by inputting successive image data, dividing the image data into blocks each formed from a plurality of pixels, detecting a motion vector of each block, calculating a probability at which the block has a predetermined area label, in accordance with the motion vector and an area label of a neighboring block, determining an area label of each block in accordance with a calculation result, and dividing the image data into areas of respective objects in accordance with the determined area label.

An image processing apparatus/method according to another aspect of the present invention is characterized by inputting successive image data, generating a cell serving as a processing unit of area division of the image data, initially dividing the image data to initialize the cell of the image data, calculating a probability at which the cell has a predetermined area label, thereby determining an area label of the cell from a calculation result, and dividing the image data into areas of respective objects on the basis of the determined area label, wherein initial division processing executes initial division of image data of a processing frame using an area division result of image data of a neighboring frame.

A recording medium according to still another aspect of the present invention is characterized by storing a code of the input step of inputting successive image data, a code of the block division step of dividing the image data into blocks each formed from a plurality of pixels, a code of the detection step of detecting a motion vector of each block, a code of the calculation step of calculating a probability at which the block has a predetermined area label, in accordance with the motion vector and an area label of a neighboring block, a code of the determination step of determining an area label of each block in accordance with a determination result of the calculation step, and a code of the area division step of dividing the image data into areas of respective objects in accordance with the area label determined in the determination step.

A recording medium according to still another aspect of the present invention is characterized by storing a code of the input step of inputting successive image data, a code of the cell generation step of generating a cell serving as a processing unit of area division of the image data, a code of the initial division step of initially dividing the image data and initializing the cell of the image data, a code of the area label determination step of calculating a probability at which the cell has a predetermined area label, and determining an area label of the cell from a calculation result, and a code of the area division step of dividing the image data into areas of respective objects on the basis of the area label determined in the area label determination step, wherein the initial division step comprises executing initial division of image data of a processing frame using an area division result of image data of a neighboring frame.

Other objects, features and advantages of the present invention will become apparent from the following detailed description taken in conjunction with the accompanying drawings.

DETAILED DESCRIPTION OF THE PREFERRED EMBODIMENTS

Embodiments of the present invention will be described in detail below with reference to the accompanying drawings.

Figure 1:
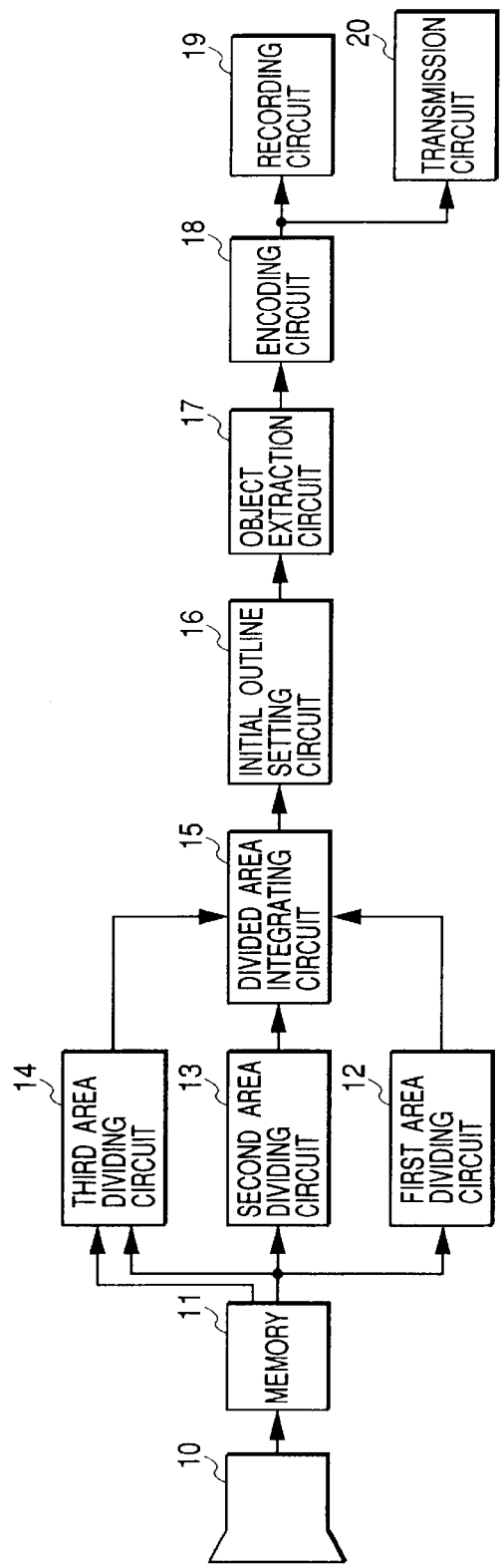
FIG. 1 is a block diagram showing the schematic arrangement of an image processing apparatus according to the first embodiment of the present invention.

FIG. 1 is a block diagram showing the schematic arrangement of an image processing apparatus according to the first embodiment of the present invention.

In FIG. 1, a video camera 10 outputs moving picture data. A memory 11 stores the moving picture data output from the video camera 10. Note that the memory 11 has a storage capacity enough to store image data of a plurality of frames.

A first area dividing circuit 12 divides subject image data of one frame read out from the memory 11 into areas on the basis of the color and the position of a pixel in the frame.

A second area dividing circuit 13 divides the subject image data into blocks each made up of a plurality of pixels. The second area dividing circuit 13 detects the spatial frequency of each block, and divides the subject image data into a plurality of areas in accordance with the detection result.

A third area dividing circuit 14 compares the subject image data with image data of another frame (to be referred to as reference image data hereinafter) read out from the memory 11, calculates the motion vector of the subject image data, and divides the subject image data into a plurality of areas in accordance with the calculation result. Details of the third area dividing circuit 14 will be described later.

A divided area integrating circuit 15 integrates the area division results of the circuit 12, 13, and 14, and outputs the final area division result. As will be described later, an area division result is obtained from the third area dividing circuit 14 in units of blocks having a predetermined size. The divided area integrating circuit 15 classifies boundary portions using the area division results of the first and second area dividing circuits 12 and 13 in order to more finely classify boundary portions between areas that are obtained from the area division result of the third area dividing circuit 14.

The processing units of area division in the first and second area dividing circuits 12 and 13 are smaller than the processing unit of area division in the third area dividing circuit 14.

An initial outline, setting circuit 16 obtains an object area in units of predetermined blocks using the divided area integrating circuit 15, and sets an initial outline at the boundary of the object area.

An object extraction circuit 17 converges the initial outline using a dynamic outline model called a snake on the basis of the initial outline set by the initial outline setting circuit 16 so as to minimize the energy function. An area surrounded by the converged outline is output as shape data.

The dynamic outline model called a snake defines an energy function which minimizes when an outline is extracted, and attains a minimum solution from a proper initial value by repetitive calculation. The energy function is defined by the linear sum of external energy serving as a constraint on the edge point, and internal energy serving as a constraint on smoothness.

In general, the snake is an outline extraction model which has a shape determined as a minimum energy state, and is obtained by rewriting an outline (closed curve) expressed by a parameter on an image plane (x,y):

$$v(s)=(x(s), y(s))$$

for 0<s<1 so as to minimize an energy function defined by equation (1):

$$Esnake(v(s)) = \int_0^1 (Eint(v(s)) + Eimage(v(s)) + Econ(v(s)))ds \quad (1)$$

$$Espline(v(s)) = \frac{1}{2}\{\alpha \cdot (v'(s))^2 + \beta \cdot (v''(s))^2\} \quad (2)$$

$$Eedge(v(s)) = -\frac{1}{2}\gamma|\nabla l(v(s))|^2 \quad (3)$$

where Eint is internal energy, Eimage is image energy, and Econ is external energy. Econ is used when force forcibly acts on the snake. External energy is used as needed.

In many cases, Eint uses Espline in equation (2) representing the smoothness of the outline. v'(s) and v''(s) represent first and second differentials of v(s), respectively. $\alpha$ and $\beta$ represent weighting coefficients. $\alpha$ and $\beta$ are generally functions of s, but constants in this case. By minimizing Espline, the snake receives a force of smoothly contracting the snake.

Eimage often uses Eedge in equation (3) defined using image luminance l(v(s)). Eedge represents the magnitude of luminance gradient. By minimizing Eedge, the snake receives a force of attracting the snake to an edge. $\gamma$ represents a weighting coefficient with respect to image energy.

An encoding circuit 18 encodes the subject image data based on shape data detected by the object extraction circuit 17. This encoding processing executes arbitrary shape encoding processing standardized by MPEG-4.

A recording circuit 19 records the image data encoded by the encoding circuit 18 on a recording medium such as a memory-, hard disk, or video tape.

A transmission circuit 20 transmits the image data encoded by the encoding circuit 18 to an external terminal device via the Internet or the like.

Figure 2:
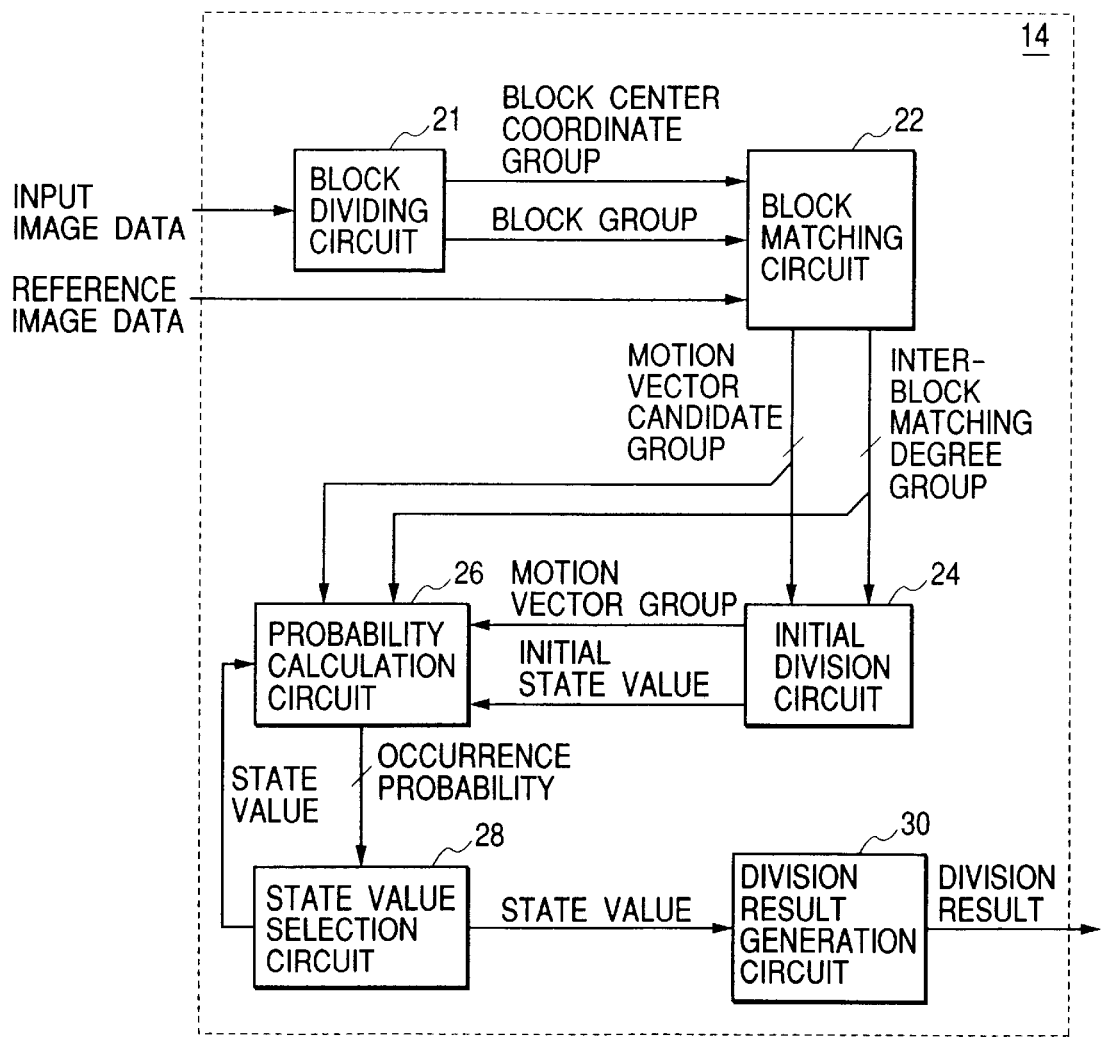
FIG. 2 is a block diagram showing the detailed arrangement of a third area dividing circuit 14.

FIG. 2 is a block diagram showing the detailed arrangement of the third area dividing circuit 14.

The third area dividing circuit 14 comprises a block dividing circuit 21, block matching circuit 22, initial division circuit 24, probability calculation circuit 26, state value selection circuit 28, and division result generation circuit 30. The third area dividing circuit 14 of the first embodiment is especially characterized by processing in the probability calculation circuit 26. In the first embodiment, a cell serving as the processing unit of area division is a block for detecting a motion vector.

The operation of the circuit 14 shown in FIG. 2 will be described with reference to FIG. 3.

Let $f_k$ be the frame of subject image data, and $f_r$ be the frame of reference image data. The block dividing circuit 21 divides subject image data into blocks within the frame $f_k$. The shape and size of a block after division are not limited to specific ones. In the first embodiment, one frame is divided into blocks each made up of m×n pixels. The block dividing circuit 21 outputs to the block matching circuit 22 block center coordinates and the image data of blocks for all the blocks generated by division. The center coordinates of a block $B_i$ are $(s_i,t_i)$.

The block matching circuit 22 calculates matching between the block $B_i$ from the block dividing circuit 21 and reference image data of the reference image frame $f_r$. More specifically, the block matching circuit 22 scans the block $B_i$ of the subject image within a square block of M×N pixels centered on $(s_i,t_i)$ in the reference image frame $f_r$, and calculates the matching degree at each scan position. Note that M>m and N>n.

Letting $Br_j$ be a target scan block equal in size to the block $B_i$ within the reference image frame $f_r$, a motion vector candidate $v_{ij}$ is a vector from the center coordinates of the block $B_i$ to those of the block $Br_j$. At each scan position, an inter-block matching degree $e_{ij}$ between the blocks $B_i$ and $Br_j$ is calculated. This processing calculates (M−m)×(N−n) motion vector candidates and inter-block matching degrees $e_{ij}$ for the block $B_i$.

A method of calculating the inter-block matching degree $e_{ij}$ will be explained.

Let $b_i$ be a block feature vector generated from the pixels of the block $B_i$, and $br_j$ be a block feature vector generated from the pixels of the target scan block $Br_j$. The block feature vector can be defined using the average color vector of pixels belonging to a block, the spatial frequency, or the like. The first embodiment assumes the block feature vector as a vector generated by aligning the color vectors of pixels belonging to a block.

When $e_{ij}$ is to be calculated using a norm $d_{ij}$ of a difference vector between $b_i$ and $br_j$, e.g., $e_{ij}=\exp(-d_{ij})$ is set. When $e_{ij}$ is to be calculated using the inner product of $b_i$ and $br_j$, e.g., the directional vectors of $b_i$ and $br_j$ are respectively defined as $h_i$ and $hr_j$, $e_{ij}=h_i \cdot hr_j$ is set.

As a method of scanning the block $B_i$, full search and step search are conventionally known well, but an arbitrary scan method can be used. The first embodiment uses full search.

The block matching circuit 22 outputs the motion vector candidate $v_{ij}$ and inter-block matching degree $e_{ij}$ calculated in this way to the initial division circuit 24 and probability calculation circuit 26.

The first embodiment executes area division processing by the model of MRF (Markov Random Field) using a motion vector as a parameter.

The initial division circuit 24 determines the initial state of area division and the initial value of the motion vector of each block.

Figure 4:
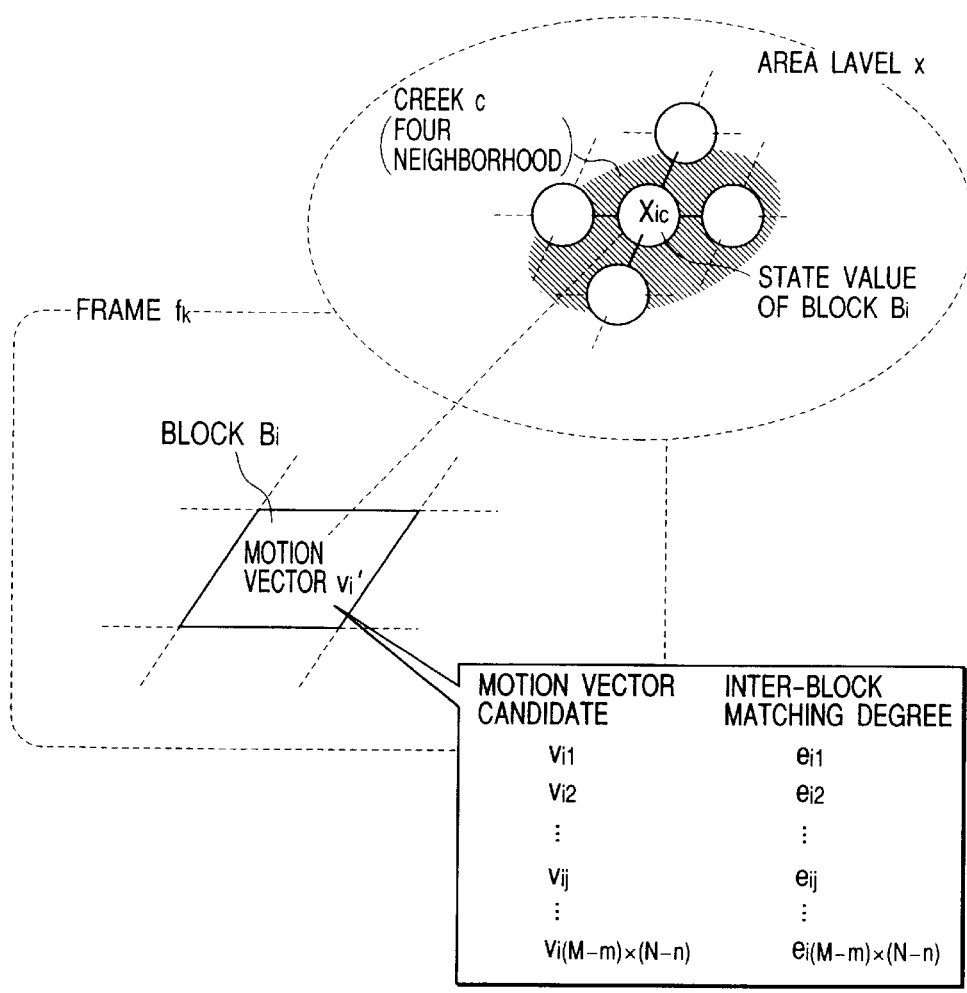
FIG. 4 is a schematic view showing the relationship between a motion vector candidate $v_{ij}$, motion vector, and status value $x_{i_c}$.

Processing in the initial division circuit 24 will be described with reference to FIG. 4.

For the block $B_i$, the initial division circuit 24 sets, as the initial value of a motion vector $v_i'$ in the block $B_i$, a motion vector $v_{ij}$ corresponding to a scan position at which the inter-block matching degree $e_{ij}$ maximizes. In addition, the initial division circuit 24 determines using a random number the initial value of a state value $x_{i_c}$ corresponding to the area label of the area division result of the block $B_i$.

A creek c is a creek in an area, i.e., MRF for determining the state value. In the first embodiment, the creek is four neighboring blocks around the block $B_i$.

The probability calculation circuit 26 calculates occurrence probabilities P of all the combinations of motion vector candidates $v_{ij}$ and state values $x_{i_c}$. The state value corresponds to the area label of the area division result. A probability $P(x_{i_c}|v_{ij})$ at which the motion vector $v_{ij}$ coincides with the state value $x_{i_c}$ is given by $$P(x_{i_c}|v_{ij}) = \frac{\exp D(x_{i_c}) \cdot \exp U(v_{ij}|x_{i_c})}{Z(x_{i_c}) Z(x_{i_c}, v_{ij}) P(v_{ij})}$$

for $$Z(x_{i_c}) = \sum_c \exp U(x_{i_c})$$

$$Z(x_{i_c}, v_{ij}) = 2\pi^{\frac{\alpha}{2}} |\sigma_{x_{i_c}}|^{\frac{1}{2}}$$

$$D(x_{i_c}, v_{ij}) = -\frac{1}{2}(v_{ij} - \mu_{x_{i_c}})^T \sigma_{x_{i_c}} (v_{ij} - \mu_{x_{i_c}})$$

$$U(x_{i_c}) = \beta \sum_{g \in c} \lambda_g$$

$$\lambda_g = \begin{cases} 1 & (\text{if } x_{g_c} = x_{i_c}) \\ -1 & (\text{if } x_{g_c} \neq x_{i_c}) \end{cases}$$

The integer j takes a value within a range of [1, (M−m)×((N−n)]. $\alpha$ represents the number of dimensions of $b_i$; and $\beta$, an arbitrary real number. $P(v_{ij})$ is a value prepared by normalizing $e_{ij}$ to [0,1]. $\sigma_{x_c}$ represents the covariance matrix of the motion vectors of blocks having the same area label; and $\mu_{x_c}$, the average of the motion vectors of blocks having the same area label. These values change depending on the j value, and must be calculated every time the probability is calculated.

After the occurrence probabilities of combinations of motion vector candidates and state values are calculated, the state value selection circuit 28 selects the state value of each block. That is, the state value selection circuit 28 selects for each block a combination of a motion vector candidate and state value at which the occurrence probability maximizes, and updates the motion vector and state value of each block. More specifically, the state value selection circuit 28 selects a motion vector candidate and state value at which the occurrence probability maximizes. The circuit 28 sets the selected motion vector candidate $v_{ij}$ as the motion vector $v_i'$ of the block $B_i$, and the state value $x_{i_c}$ of the block $B_i$ as a selected state value. The motion vector is used for calculation of the average value $\mu_{x_c}$ and covariance matrix $\sigma_{x_c}$ in calculating the probability of another block. The ratio of blocks whose state values do not change is calculated, and if this ratio does not exceed a predetermined ratio, probability calculation by the probability calculation circuit 26 is executed again. Probability calculation is repeated until the change ratio exceeds the predetermined ratio.

A division result generation circuit 30 generates and outputs a division result (label image corresponding to the state value) from the state value of each block determined by the state value selection circuit 28. By a series of processes, the frame of a moving picture can be divided into areas for each object.

The first embodiment determines a motion vector from all the motion vector candidates. Alternatively, motion vector candidates may be limited to upper n candidates in the descending order of the inter-block matching degree to execute subsequent processing. This can increase the area division speed.

Alternatively, a threshold may be set for the inter-block matching degree, and motion vector candidates may be limited to ones having inter-block matching degrees higher than the threshold to execute subsequent processing. This can also increase the area division speed.

According to the first embodiment, the determination result of area division using a motion vector is modified or corrected with reference to the neighboring state. Accordingly, an object extraction result having high reliability can be obtained, and encoding processing in units of objects complying with the MPEG-4 standard can be accurately executed.

The second embodiment is the same as the first embodiment except for the arrangement of a third area dividing circuit 14. In the second embodiment, only the processing operation of the third area dividing circuit 14 different from the first embodiment will be described.

Figure 5:
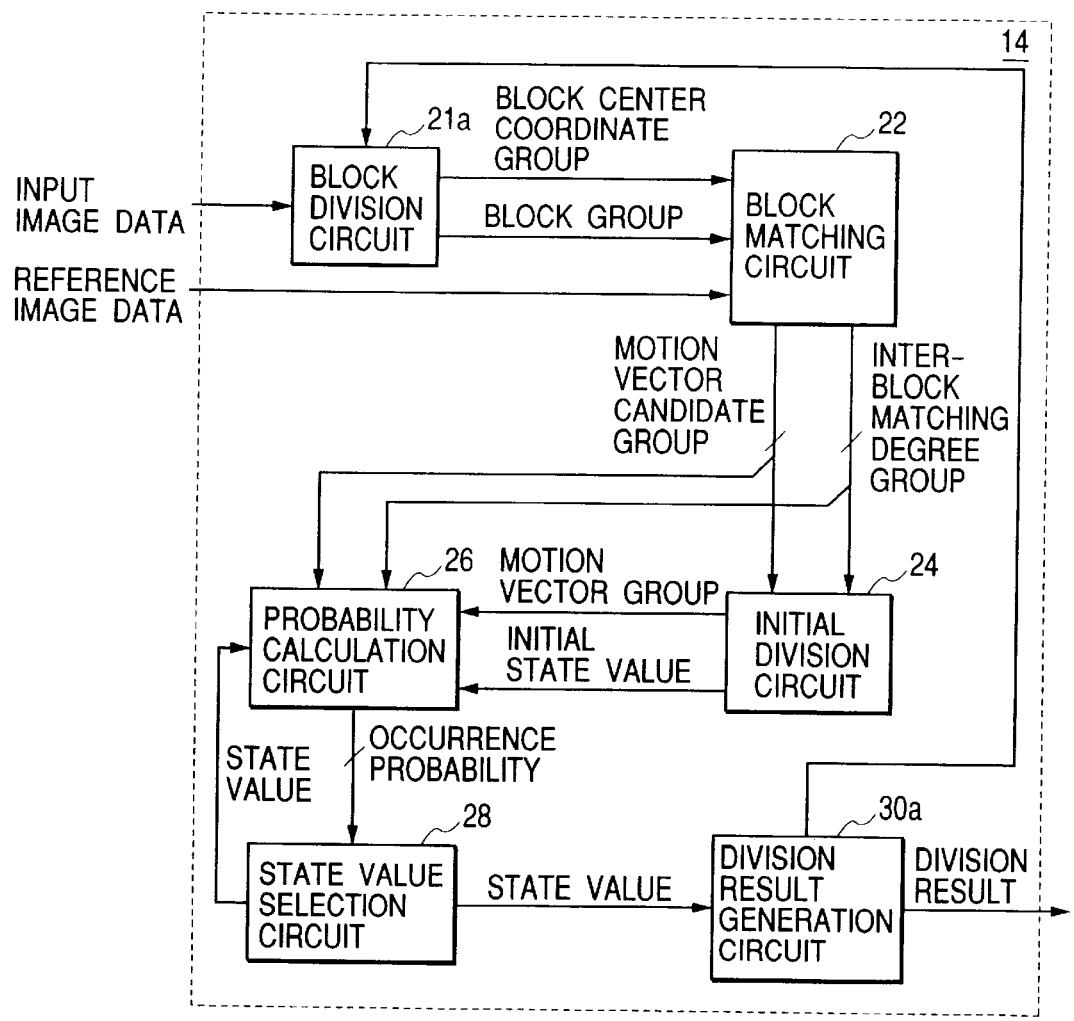
FIG. 5 is a block diagram showing the detailed arrangement of a third area dividing circuit in the second embodiment.

FIG. 5 is a block diagram showing the detailed arrangement of the third area dividing circuit in the second embodiment. Note that the same reference numerals as in FIG. 2 denote the same parts, and a description thereof will be omitted. In the second embodiment, a block size for obtaining a motion vector recursively decreases.

Assuming that the initial block size in a block division circuit 21*a* is 8×8 pixels, a division result generation circuit 30*a* detects a block corresponding to the boundary portion of an object, and controls the block division circuit 21*a* so as to re-divide the block at a block size of 4×4 pixels. Under this control, the block division circuit 21*a* divides the block into blocks of 4×4 pixels. The re-divided block undergoes the same processing as described in the first embodiment by circuits 22, 24, 26, and 28. The division precision obtained by the division result generation circuit 30*a* for the re-divided block is 4×4. Further, a block corresponding to an object boundary from this result is re-divided, and subjected to the same processing. In this fashion, the second embodiment can re-divide a block at a boundary portion to finally achieve area division at the pixel precision.

The third embodiment is the same as the first embodiment except for the arrangement of a third area dividing circuit 14. The third embodiment also uses the heat bath method serving as one of the methods of realizing area division processing using the model of MRF (Markov Random Field).

Figure 6:
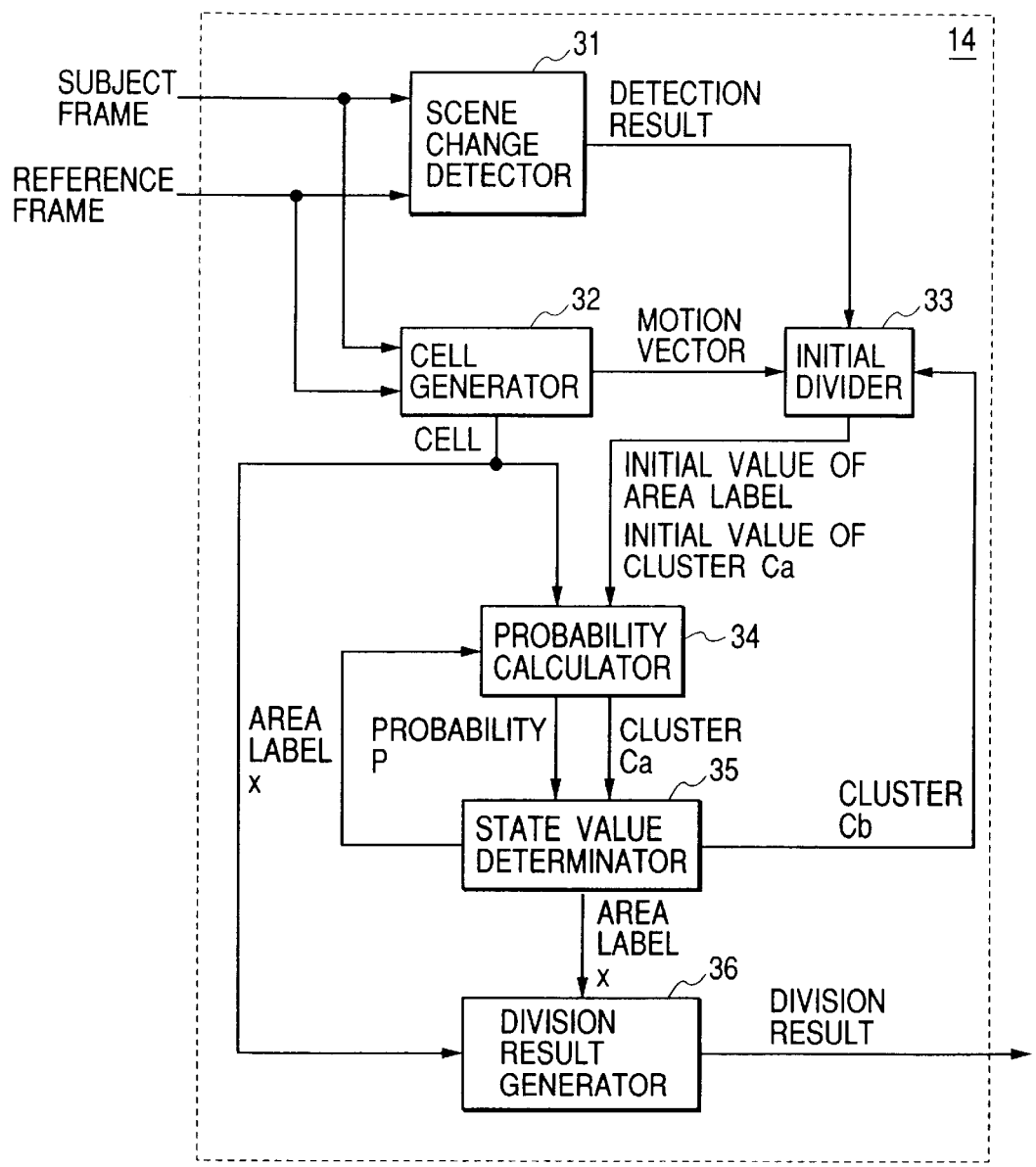
FIG. 6 is a block diagram showing the detailed arrangement of a third area dividing circuit in the third embodiment.

FIG. 6 is a block diagram showing still another arrangement of the third area dividing circuit 14.

The third area dividing circuit 14 of this embodiment is constituted by a scene changer 31, a cell generator 32 for generating a cell (processing unit of area division), an initial divider 33 for initially dividing a cell, a probability calculator 34 for calculating a probability at which the cell attains a given area label, a state value determinator 35 for determining the area label of the cell from the division result of the probability calculator 34, and a division result generator 36 for outputting a division result from the cell and area label.

The third area dividing circuit 14 receives a reference frame, and a subject frame serving as an area division target. The scene changer 31 determines from the subject frame and reference frame whether the scene has changed. The reference frame is not limited to a frame immediately preceding the subject frame. A scene change is detected by detecting the inter-frame difference value of a pixel and determining from the detection result whether the scene has changed.

The cell generator 32 executes block matching between the subject frame and the reference frame to calculate a motion vector for each block of the subject frame, and generates as a cell a processed block for which a motion vector has been detected. Note that block matching processing in the third embodiment is the same as that described in the first embodiment with reference to FIG. 3, and a description thereof will be omitted.

The cell is in one-to-one correspondence with a block prepared by dividing the subject frame. Each cell is characterized by a motion vector determined by the above method.

The initial divider 33 sets the initial value of an area label in the cell generated by the cell generator 32, and sets a cluster corresponding to an area in accordance with the initial value. The cluster is assigned a cluster number corresponding to the area label.

The probability calculator 34 calculates a probability P at which each cell belongs to each cluster. The state value determinator 35 selects a cluster in which the probability P of each cell takes a maximum value, and sets the cluster number of the selected cluster as the area label of the cell.

When the ratio of cells whose area label values are changed by the processes of the probability calculator 34 and state value determinator 35 does not exceed a predetermined ratio, the processes of the probability calculator 34 and state value determinator 35 are repeated until that ratio of cells exceeds the predetermined ratio. The time during which the processes of the probability calculator 34 and state value determinator 35 are performed will be called a convergent time.

Finally, the division result generator 36 outputs a division result in accordance with the area label of the cell.

The operations of the initial divider 33, probability calculator 34, and state value determinator 35 will be described in more detail below.

The initial divider 33 calculates the initial value of the area label $x_{i_c}$ of a cell i and the feature amount of a cluster m to which cells having an area label $x_{i_c}$ of the same value m belong. A creek c is an area for determining the state of a cell. In the third embodiment, four neighboring blocks are defined as the creek c. The area label $x_{i_c}$ is a natural number whose upper limit is a predetermined value j. The initial value of the area label $x_{i_c}$ of each cell is set to a value selected from a natural number of j or less at random. This processing generates j clusters each made up of cells having an area label of the same value. Ca represents a set of these clusters. Each cluster belonging to Ca is characterized by the average of the feature amounts of cells belonging to the cluster.

After that, when the scene changer 31 determines that the scene has not changed, and area division of a frame immediately preceding a subject frame has already been done, a set Cb of k clusters formed by division of the immediately preceding frame is added to the set Ca. At this time, the features of the clusters belonging to the set Cb are the same as those obtained at the end of division of the immediately preceding frame. Successive frames are considered to have similar frame structures as far as the scene has not changed. Hence, successive frames form clusters having similar features at high probability. Thus, adding the set Cb to the set Ca can prompt convergence of the area label.

The probability calculator 34 calculates the probability P at which a block i belongs to the cluster m. A probability $P(x_{i_c}=m|v_i)$ at which a given motion vector $v_i$ as the feature amount of the block i belongs to the cluster m is given by $$P(x_{i_c} = m|v_i) = \frac{\exp D(x_{i_c}) \cdot \exp U(v_i|x_{i_c})}{Z(x_{i_c})Z(x_{i_c}, v_i)P(v_i)} \quad (4)$$

for $$Z(x_{i_c}, v_i) = 2\pi^{\frac{\alpha}{2}} |\sigma_{x_{i_c}}|^{\frac{1}{2}} \quad (5)$$

$$Z(x_{i_c}) = \sum_c \exp U(x_{i_c}) \quad (6)$$

-continued $$D(x_{i_c}, v_i) = -\frac{1}{2}(v_i - \mu_{x_{i_c}})^T \sigma_{x_{i_c}}(v_i - \mu_{x_{i_c}}) \quad (7)$$

$$U(x_{i_c}) = \beta \sum_{g \in c} \lambda_g \quad (8)$$

$$\lambda_g = \begin{cases} 1 & (\text{if } x_{g_c} = x_{i_c}) \\ -1 & (\text{if } x_{g_c} \neq x_{i_c}) \end{cases} \quad (9)$$

$$P(v_i) = 1 \quad (10)$$

where α is the number of dimensions of $v_i$, β is an arbitrary real number, $\sigma_{x_c}$ is the covariance matrix of the motion vectors of blocks having the same area label, and $\mu_{x_c}$ is the average of the motion vectors of blocks having the same area label.

After the probability at which all the blocks belong to a corresponding cluster is calculated by these procedures, the state value determinator 35 determines the area label of each block.

Equation (4) is derived from equations (5) and (7), equations (6) and (8), and $P_{v_c}^{-1}$. Equation (7) expresses the distance between the component of the motion vector of a cell and the component of the average vector of a cluster. This distance is normalized by the variance value of the component of the motion vector of a cell belonging to the cluster (Mahalanobis distance). Equation (8) calculates the continuity of areas by MRF (Markov Random Field). λg in equation (8) is given by equation (9). β is a parameter for determining the weight of the continuity of areas with respect to the Mahalanobis distance of the component of the motion vector. Equation (9) is set such that, as the matching degree between the state value of a peripheral cell and that of a target cell is higher, the value of equation (4) is larger. As given by equation (10), a line process for limiting a creek is adopted to consider the edge instead of simply considering the continuity of areas. Equations (5) and (6) are partition functions for normalizing equations (7) and (8), respectively, and are used to calculate equation (4) as a probability. $P(v_c)$ is the occurrence probability of a block, and is always 1.

Figure 7:
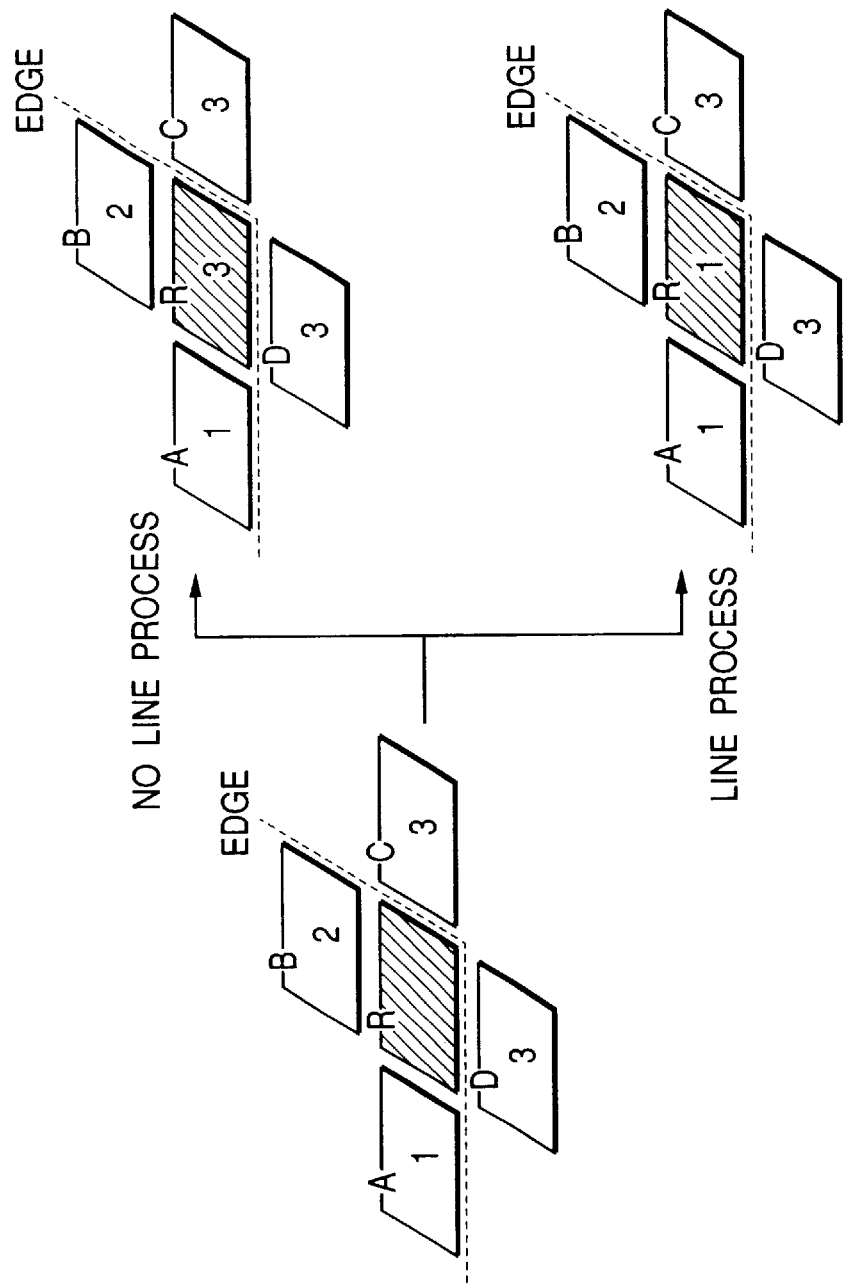
FIG. 7 is a view showing a line process.

The line process will be explained with reference to FIG. 7.

The line process removes a cell which satisfies a certain condition among cells contained in a creek from MRF calculation. For example, in the third embodiment, a cell which satisfies a certain condition means a cell which is separated from a target cell by an edge. In FIG. 7, assume that in determining the state of a cell R, the state values of cells A, B, C, and D contained in the creek of the cell R are 1, 2, 3, and 3, respectively, and edges are detected between the cell R and the cells C and D.

When the β value in equation (8) is very large, and priority is given to the continuity of areas rather than the closeness of the components of motion vectors, the state value of the cell R, which is separated by the edges, becomes 3 unless the line process is not adopted. To the contrary, the cells C and D separated by the edges can be removed from MRF calculation of equation (8) to set an appropriate state value to the cell R. For example, when the motion vector of the cell R is closer to that of the cell A than that of the cell B, the state value of the cell R is 1, as shown in FIG. 7.

The state value determinator 35 determines an area label. A cluster number m of a cluster having the highest probability P for each block i is determined as the value of the area label $x_{i_c}$ of the block i. The state value determinator 35 calculates the ratio of blocks whose area label values have not changed. If this ratio does not exceed a predetermined ratio, the state value determinator 35 causes the probability calculator 34 to repeat probability calculation until the ratio exceeds the predetermined ratio. If the ratio of blocks whose area label values have not changed exceeds the predetermined value, the set of clusters in which the number of belonging cells at that time is 0 or more is set as Cb, which is used for area division of the next frame.

Figure 8:
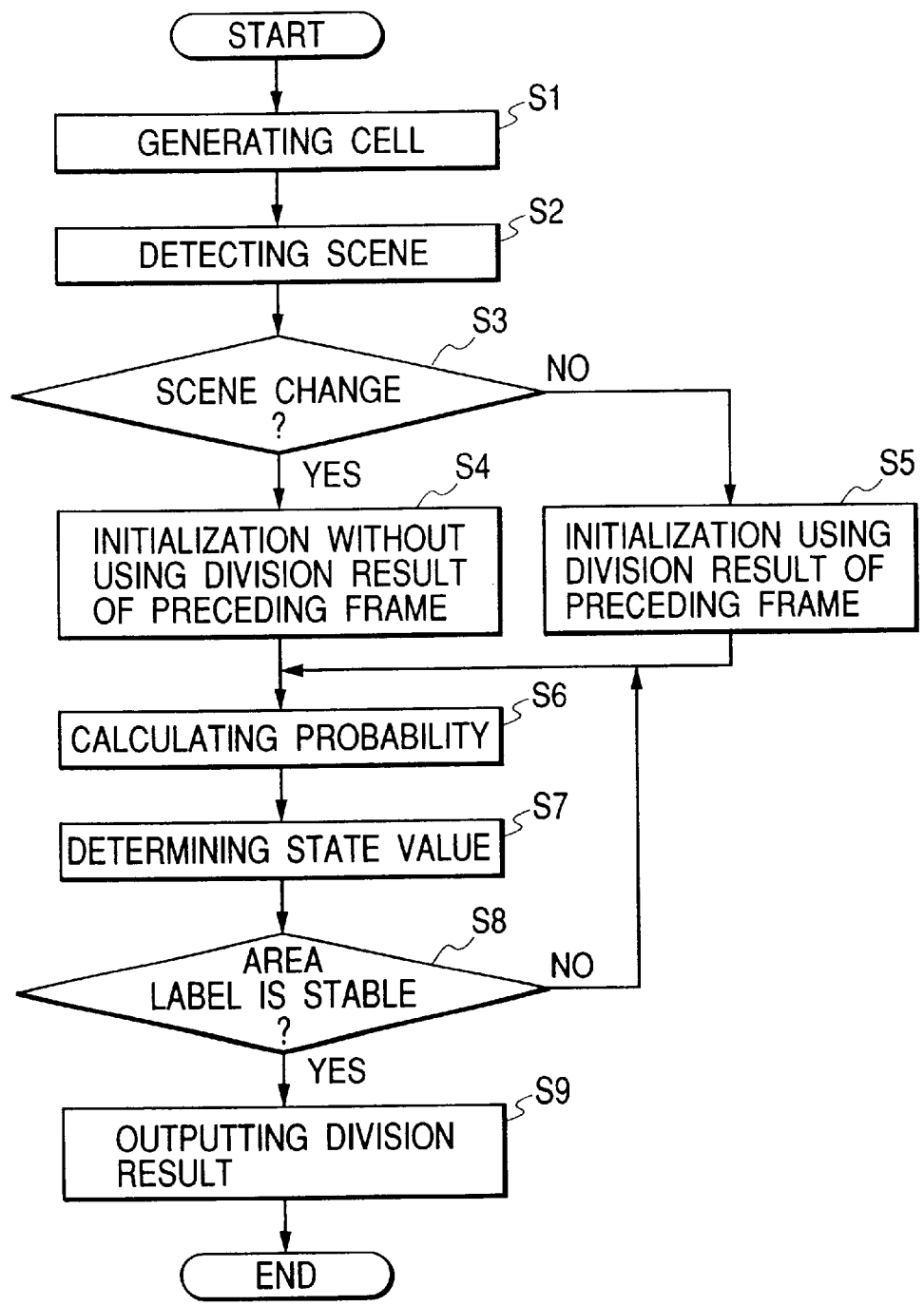
FIG. 8 is a flow chart showing the operation of an area dividing circuit 14 in the third embodiment.

FIG. 8 is a flow chart showing the operation of the area dividing circuit 14 in the third embodiment.

The cell generator 32 generates a cell (S1), and the scene changer 31 detects a scene change (S2). If a scene change is detected (Y in S3), the initial divider 33 determines the initial value of an area label using a random number for a cell in conventional initial division processing (S4). If not in a step S3, the initial divider 33 executes initial division using the division result of a preceding frame (S5).

The probability calculator 34 calculates the probability for the state value of a cell (S6), and the state value determinator 35 determines an area label (S7). Until the area label becomes stable (S8), calculation of the probability (S6) and determination of the state value (S7) are repeated. When the area label becomes stable (Y in S8), the division result generator 36 outputs a division result corresponding to the frame of a moving picture (S9).

As described above, in dividing the frame of a moving picture, the result of area division of an immediately preceding frame having a similar frame structure is added to an area label in initial division processing. Accordingly, area division can be executed at a high speed, and encoding processing in units of objects complying with the MPEG-4 standard can be accurately executed at a high speed.

The fourth embodiment is the same as the third embodiment except for the arrangement of a third area dividing circuit 14. In the fourth embodiment, only the processing operation of the third area dividing circuit 14 different from the third embodiment will be described.

Figure 9:
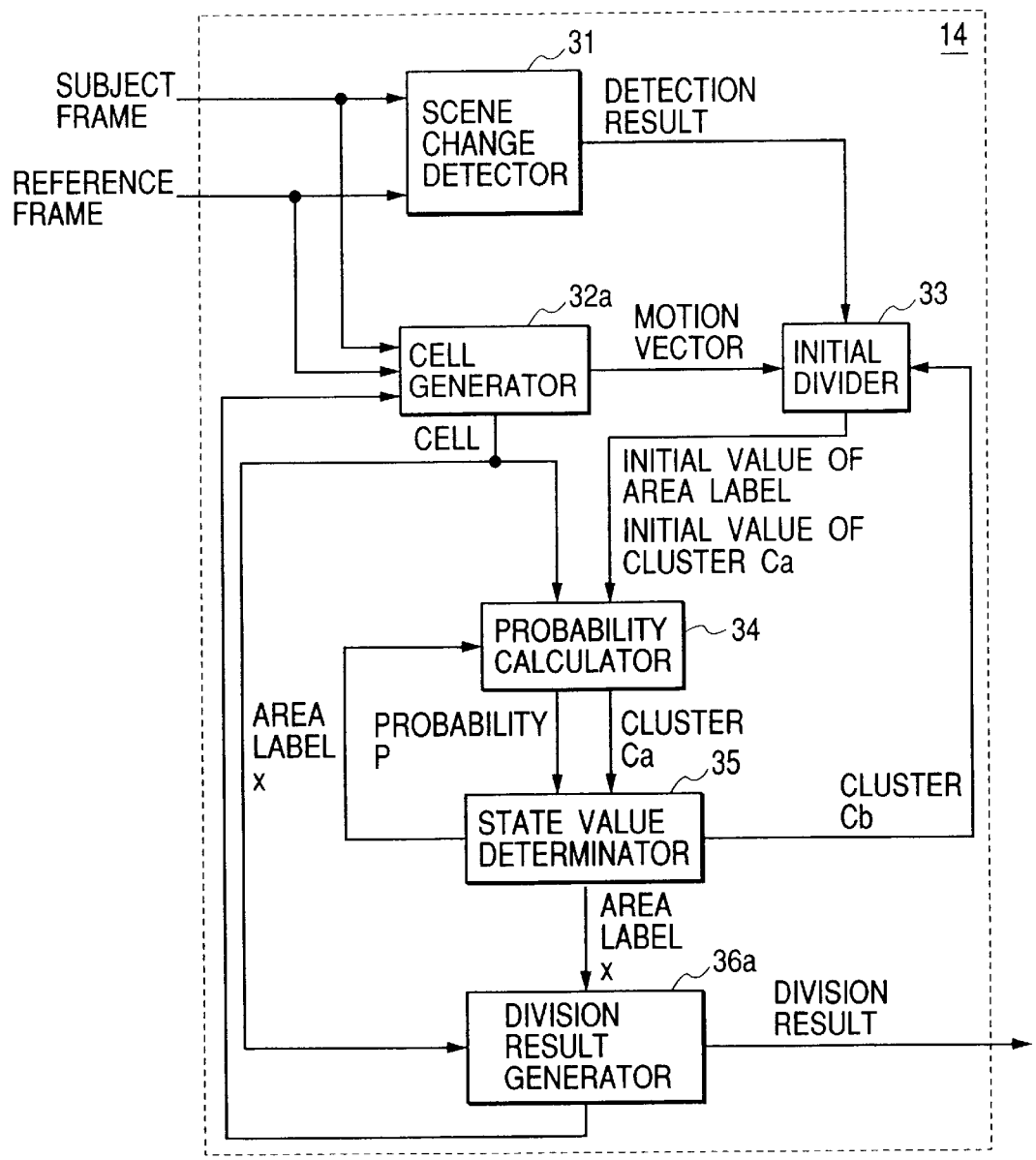
FIG. 9 is a block diagram showing the detailed arrangement of a third area dividing circuit in the fourth embodiment.

FIG. 9 is a block diagram showing the detailed arrangement of the third area dividing circuit in the fourth embodiment. Note that the same reference numerals as in FIG. 6 denote the same parts, and a description thereof will be omitted. In the fourth embodiment, the cell size recursively decreases.

Assuming that the initial block size in a cell generator 32a is 8×8 pixels, a division result generator 36a detects a block corresponding to the boundary portion of an object, and controls the cell generator 32a so as to re-divide the block at a block size of 4×4 pixels. Under this control, the cell generator 32a re-divides the block into blocks of 4×4 pixels. A motion vector is calculated in units of re-divided blocks. The re-divided block undergoes the same processing as described in the third embodiment by an initial divider 33, probability calculator 34, and state value determinator 35. The area division precision obtained by the division result generator 36a for the re-divided block is 4×4. Further, a block corresponding to an object boundary from this result is re-divided, and subjected to the same processing. Thus, the fourth embodiment can re-divide a block at a boundary portion to finally achieve area division at the boundary portion.

Re-division processing is set in advance to be executed till a block having a predetermined size.

In the third or fourth embodiment, the cell generators 32 and 32a may be operated as follows to perform area division.

The cell generators 32 and 32a recursively perform division processing when a division end condition set for a subject frame in advance is not satisfied. For example, one frame is first divided into four blocks, and whether each divided block satisfies a division end condition is checked. If the block does not satisfy the condition, the block is further divided into four blocks. This re-division processing is repeated until the block satisfies the division end condition.

The cell generators 32 and 32a generate a set of pixels obtained by division processing as a cell, and calculates the average color vector of the set of pixels belonging to the cell, or a vector representing the spatial frequency of the set of pixels belonging to the cell.

The motion vector in the third or fourth embodiment may be replaced by the average color vector or a vector representing the spatial frequency, the same probability calculation as described in the third or fourth embodiment may be performed to determine an area label, and area division of a subject frame may be done.

Note that the division end condition is whether the luminance difference in a block is equal to or less than a predetermined threshold.

Note that the present invention may be applied to a system constituted by a plurality of devices or an apparatus constituted by one device. The present invention is also achieved when program codes of software for realizing the functions of the embodiments are supplied to a computer in an apparatus or system connected to various devices, and the various devices are operated in accordance with the program stored in the computer (CPU or MPU) of the system or apparatus.

In this case, the program codes of software realize the functions of the embodiments. The program codes, and a means for supplying the program codes to the computer, e.g., a recording medium storing the program codes constitute the present invention. As the recording medium storing the program codes, a floppy disk, hard disk, optical disk, magnetooptical disk, CD-ROM, magnetic tape, nonvolatile memory card, ROM, or the like can be used.

The functions of the embodiments are realized not only when the computer executes supplied program codes but also when the program codes cooperate with an OS (Operating System) running on the computer.

The functions of the embodiments are also realized when supplied program codes are stored in the memory of a function expansion board in the computer or a function expansion unit connected to the computer, and the CPU of the function expansion board or function expansion unit performs part or all of actual processing on the basis of the instructions of the program codes.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) input means for inputting successive image data;
   b) block division means for dividing the image data into blocks each formed from a plurality of pixels;
   c) detection means for detecting a motion vector of each block;
   d) calculation means for calculating a probability at which the block has a predetermined area label, in accordance with the motion vector and an area label of a neighboring block;

e) determination means for determining an area label of each block in accordance with an output from said calculation means; and f) area division means for dividing the image data into areas of respective objects in accordance with an output from said determination means.

2. An apparatus according to claim 1, wherein said calculation means calculates the probability using a model of a Markov random field.

3. An apparatus according to claim 1, wherein said detection means detects the motion vector on the basis of an inter-block matching degree calculated from an inner product of a color vector representing a feature amount of each block.

4. An apparatus according to claim 1, wherein said detection means detects the motion vector on the basis of an inter-block matching degree calculated from a norm of a difference vector of a color vector representing a feature amount of each block.

5. An apparatus according to claim 1, further comprising means for causing said block division means to re-divide a block at a boundary portion between areas divided by said area division means, and executing processes of said detection means, calculation means, determination means, and area division means for the re-divided block.

6. An apparatus according to claim 1, wherein said input means includes image sensing means for sensing a subject image and outputting the serial image data.

7. An apparatus according to claim 1, further comprising encoding means for encoding each area divided by said area division means.

8. An apparatus according to claim 7, wherein said encoding means executes encoding processing complying with an MPEG-4 standard.

9. An apparatus according to claim 7, further comprising recording means for recording image data encoded by said encoding means on a recording medium.

10. An apparatus according to claim 7, further comprising transmission means for transmitting image data encoded by said encoding means to an external device.

11. An image processing apparatus comprising:

a) input means for inputting successive image data;

b) cell generation means for generating a cell serving as a processing unit of area division of the image data and detecting a motion vector in units of generated cells;

c) initial division means for initially dividing the image data and initializing the cell of the image data;

d) area label determination means for calculating a probability at which the cell has a predetermined area label, in accordance with the motion vector and an area label of a neighboring cell and determining an area label of the cell from a calculation result; and e) area division means for dividing the image data into areas of respective objects on the basis of an output from said area label determination means, wherein said initial division means executes initial division of image data of a processing frame using an area division result of image data of a neighboring frame.

12. An apparatus according to claim 11, further comprising scene change detection means for detecting a scene change of an image, and wherein said initial division means executes initial division of image data of the processing frame without using an area division result of image data of a neighboring frame when said scene change detection means detects a scene change of an image.

13. An apparatus according to claim 11, wherein said area label determination means calculates the probability using a model of a Markov random field.

14. An apparatus according to claim 11, wherein said cell generation means detects an average color vector in units of generated cells.

15. An apparatus according to claim 14, wherein said area label determination means calculates the probability in accordance with the average color vector and an area label of a neighboring cell.

16. An apparatus according to claim 15, wherein said area label determination means calculates the probability using a model of a Markov random field.

17. An apparatus according to claim 11, wherein said cell generation means detects a vector representing a spatial frequency in units of generated cells.

18. An apparatus according to claim 17, wherein said area label determination means calculates the probability in accordance with the vector representing the spatial frequency and an area label of a neighboring cell.

19. An apparatus according to claim 18, wherein said area label determination means calculates the probability using a model of a Markov random field.

20. An apparatus according to claim 11, wherein said cell generation means recursively divides the image data until a predetermined division condition is satisfied, and sets a divided block as a cell.

21. An apparatus according to claim 11, wherein said input means includes image sensing means for sensing a subject image and outputting the serial image data.

22. An apparatus according to claim 11, further comprising encoding means for encoding each area divided by said area division means.

23. An apparatus according to claim 22, wherein said encoding means executes encoding processing complying with an MPEG-4 standard.

24. An apparatus according to claim 22, further comprising recording means for recording image data encoded by said encoding means on a recording medium.

25. An apparatus according to claim 22, further comprising transmission means for transmitting image data encoded by said encoding means to an external device.

26. An image processing method comprising the steps of:

a) inputting successive image data;

b) dividing the image data into blocks each formed from a plurality of pixels;

c) detecting a motion vector of each block;

d) calculating a probability at which the block has a predetermined area label, in accordance with the motion vector and an area label of a neighboring block;

e) determining an area label of each block in accordance with a calculation result; and f) dividing the image data into areas of respective objects in accordance with the area label determined in the determination step.

27. An image processing method comprising the steps of:

a) inputting successive image data;

b) generating a cell serving as a processing unit of area division of the image data and detecting a motion vector in units of generated cells;

c) initially dividing the image data and initializing the cell of the image data;

d) calculating a probability at which the cell has a predetermined area label, in accordance with the motion vector and an area label of a neighboring cell, and determining an area label of the cell from a calculation result; and e) dividing the image data into areas of respective objects on the basis of the area label determined in the area label determination step, wherein the initial division step comprises executing initial division of a processing frame using an area division result of image data of a neighboring frame.

28. A recording medium storing program codes of the image processing step, the program codes comprising:

a) a code of the input step of inputting successive image data;

b) a code of the block division step of dividing the image data into blocks each formed from a plurality of pixels;

c) a code of the detection step of detecting a motion vector of each block;

d) a code of the calculation step of calculating a probability at which the block has a predetermined area label, in accordance with the motion vector and an area label of a neighboring block;

e) a code of the determination step of determining an area label of each block in accordance with a calculation result of the calculation step; and f) a code of the area division step of dividing the image data into areas of respective objects in accordance with the area label determined in the determination step.

29. A recording medium storing program codes of the image processing step, the program codes comprising:

a) a code of the input step inputting successive image data;

b) a code of the cell generation step of generating a cell serving as a processing unit of area division of the image data and detecting a motion vector in units of generated cells;

c) a code of the initial division step of initially dividing the image data and initializing the cell of the image data;

d) a code of the area label determination step of calculating a probability at which the cell has a predetermined area label, and determining an area label of the cell from a calculation result; and e) a code of the area division step of dividing the image data into areas of respective objects on the basis of the area label determined in the area label determination step, wherein the initial division step comprises executing initial division of image data of a processing frame using an area division result of image data of a neighboring frame.

* * * * *

UNITED STATES PATENT AND TRADEMARK OFFICE
CERTIFICATE OF CORRECTION

PATENT NO. : 6,795,578 B1  
DATED : September 21, 2004  
INVENTOR(S) : Takuya Kotani et al.

Page 1 of 1

Figure 3:
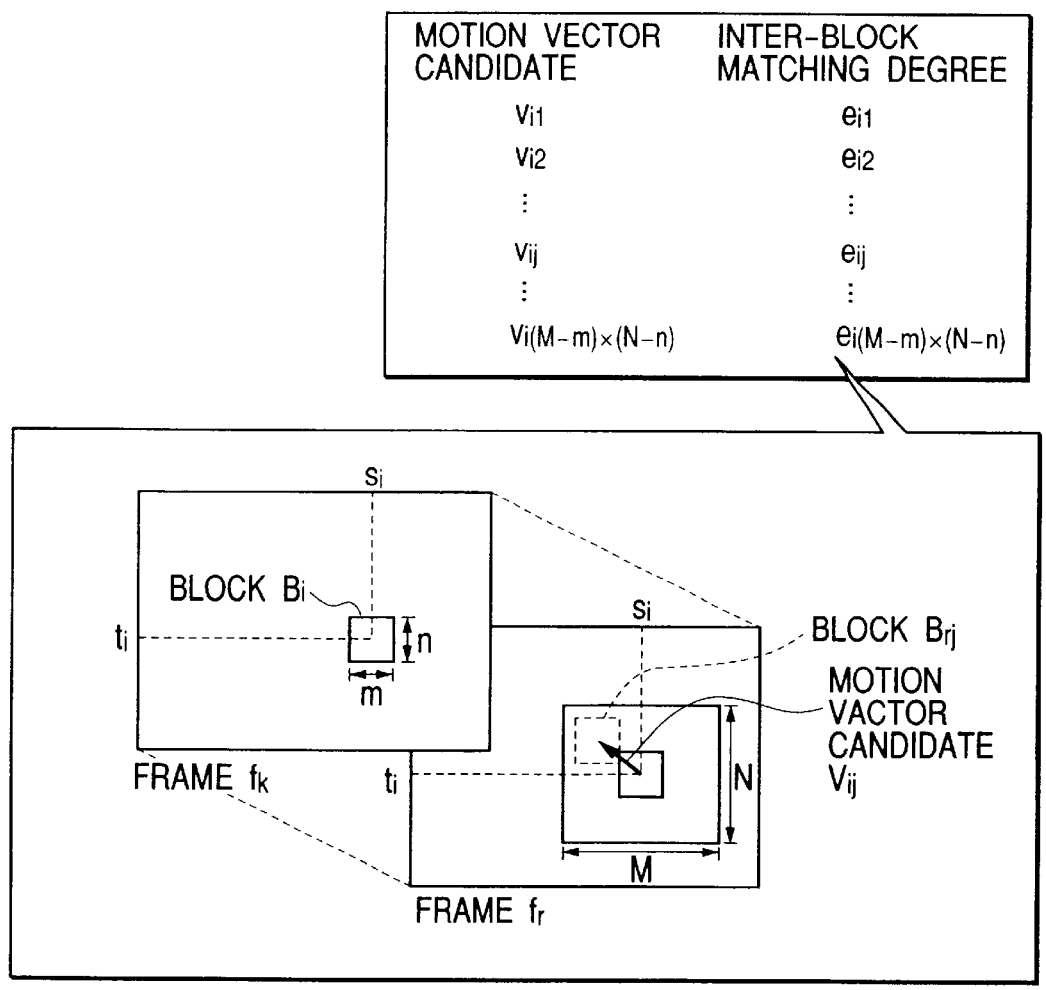
FIG. 3 is a schematic view showing the status of block matching.

It is certified that error appears in the above-identified patent and that said Letters Patent is hereby corrected as shown below:

Drawings,  
Sheet 3, Figure 3, "VACTOR" should read -- VECTOR --.  
Sheet 4, Figure 4, "LAVEL" should read -- LABEL --.

Column 5,  
Line 13, "0<s<1" should read -- $0 \leq s \leq 1$ --.  
Line 49, "memory-" should read -- memory --.

Column 7,  
Line 22, "((N-n)" should read -- (N-N --.

Signed and Sealed this

Twenty-second Day of March, 2005

JON W. DUDAS  
*Director of the United States Patent and Trademark Office*